March 31, 1953 L. G. TAYLOR 2,633,006
APPARATUS TO PROMOTE CONTROLLED FREEZING
Filed April 18, 1950 6 Sheets-Sheet 1

INVENTOR
LLOYD G. TAYLOR
BY
ATTORNEY

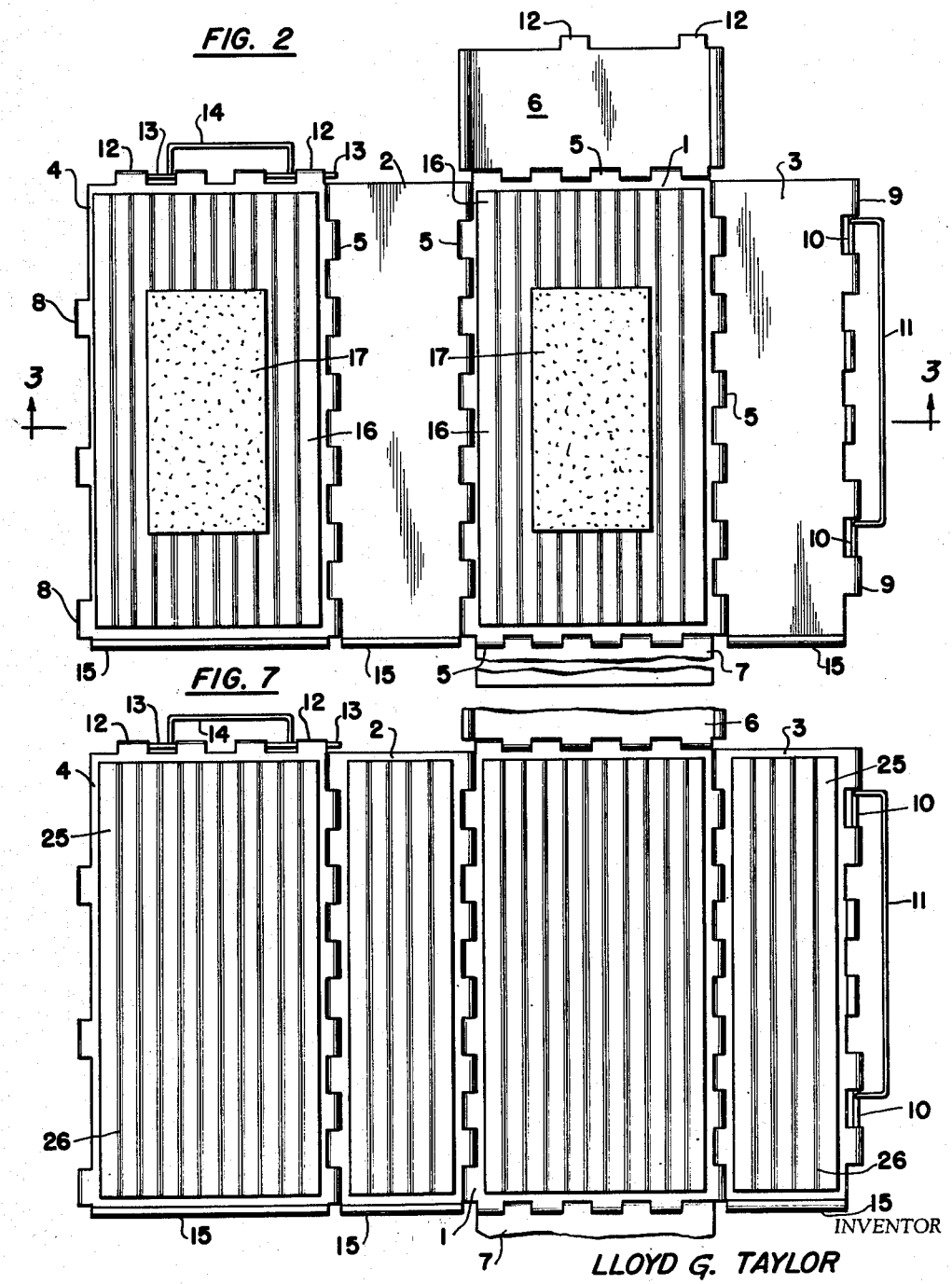

March 31, 1953 L. G. TAYLOR 2,633,006
APPARATUS TO PROMOTE CONTROLLED FREEZING
Filed April 18, 1950 6 Sheets-Sheet 3
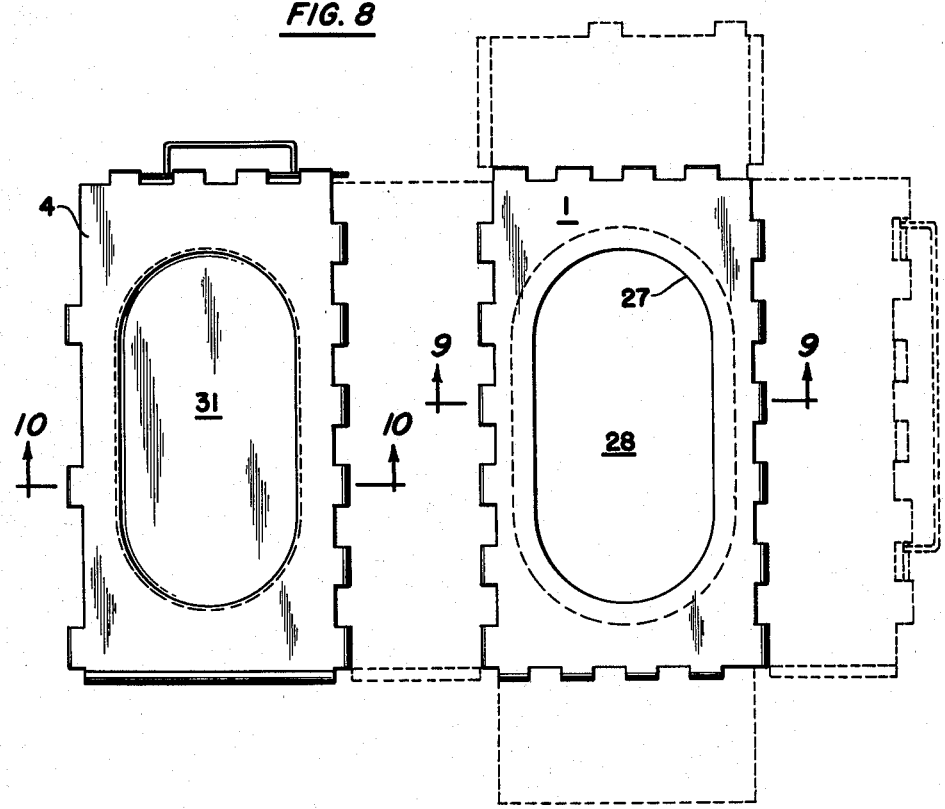
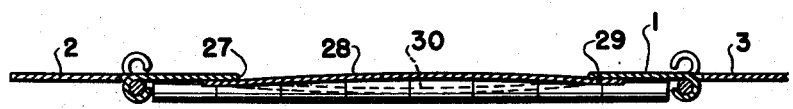
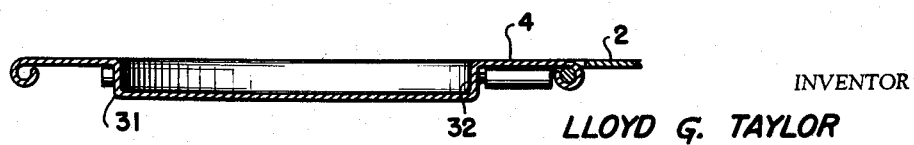
INVENTOR
LLOYD G. TAYLOR
BY
ATTORNEY March 31, 1953   L. G. TAYLOR   2,633,006
APPARATUS TO PROMOTE CONTROLLED FREEZING
Filed April 18, 1950   6 Sheets-Sheet 4

INVENTOR
LLOYD G. TAYLOR
BY
ATTORNEY

March 31, 1953 L. G. TAYLOR 2,633,006
APPARATUS TO PROMOTE CONTROLLED FREEZING
Filed April 18, 1950 6 Sheets-Sheet 5

INVENTOR
LLOYD G. TAYLOR
BY
ATTORNEY

March 31, 1953 L. G. TAYLOR 2,633,006
APPARATUS TO PROMOTE CONTROLLED FREEZING
Filed April 18, 1950 6 Sheets-Sheet 6

INVENTOR
LLOYD G. TAYLOR
BY
ATTORNEY

Patented Mar. 31, 1953

2,633,006

UNITED STATES PATENT OFFICE 2,633,006

APPARATUS TO PROMOTE CONTROLLED FREEZING

Lloyd G. Taylor, Ellicott City, Md.

Application April 18, 1950, Serial No. 156,521

6 Claims. (Cl. 62—114)

This invention relates to apparatus to promote the controlled freezing of food products and other fluid materials.

The invention is preferably carried out with a special container in conjunction with a watertight and an air-tight bag although it will be apparent that certain modifications of the containers illustrated do not require this bag. In the freezing of food products as it is carried on at this time it has been customary to use a fiber or cardboard container and to place in that container a bag and to fill the bag either with juices or fluid foods or both, up to within approximately an inch of the top of the box and then to seal the bag, close the box and place the box in a quick-freeze unit. When these packed products are removed from the quick-freeze unit the cartons are of course not transparent and a possible customer has to read the label to ascertain what is inside. Also the carton is a repeating expense and could be eliminated. Also, because the food product when placed in the bag did not go all the way to the top, the unit as frozen is not a complete rectangular solid. It has an irregular top if frozen standing as it was filled, and it does not pack well in a large compartment where it might be desired to pack such units after freezing. The irregular top is also very unattractive to the eye.

Among the objects of this invention is to make a product which will be uniform on all six sides and at least uniform on all the twelve lines forming the edges of the sides so that there may be absolute uniformity of outside edge configuration of the unit. Another object is to do away with all approximation on the part of the packer of the products as to whether an inch or other adequate space has been left for the expansion of the product in freezing. Another object of the invention is to provide expanding space for freezing. Another object is to provide a container which may be filled to the top. Another object of the invention is to produce a transparent unit of food so that an inspection would immediately show not only the type of food but the quality of the pack. Yet another object of the invention is to save the expense of the carton which otherwise must be discarded.

These and other objects of the invention will be apparent from the following description and the accompanying drawing forming a part hereof and in which:

Figure 2 is a top plan view of the form opened prior to the insertion of the empty bag.

Figure 7 shows a modifictaion of a space providing medium on four of the walls of the container.

Figure 8 shows a modification of two forms of space providing means on opposed walls of a single container.

Figure 9 is a cross-sectional view on line 9—9 of Figure 8.

Figure 10 is a cross-sectional view on line 10—10 of Figure 8.

In the drawings similar numerals refer to similar parts throughout the several views.

It has been found preferable in packing food products according to the instant invention to use a polyethylene bag. This bag is available on the market and it has been found quite flexible, transparent and air and water tight. It is quite desirable to have the bag air tight to avoid the oxidation and coloration of certain products.

Figure 1:
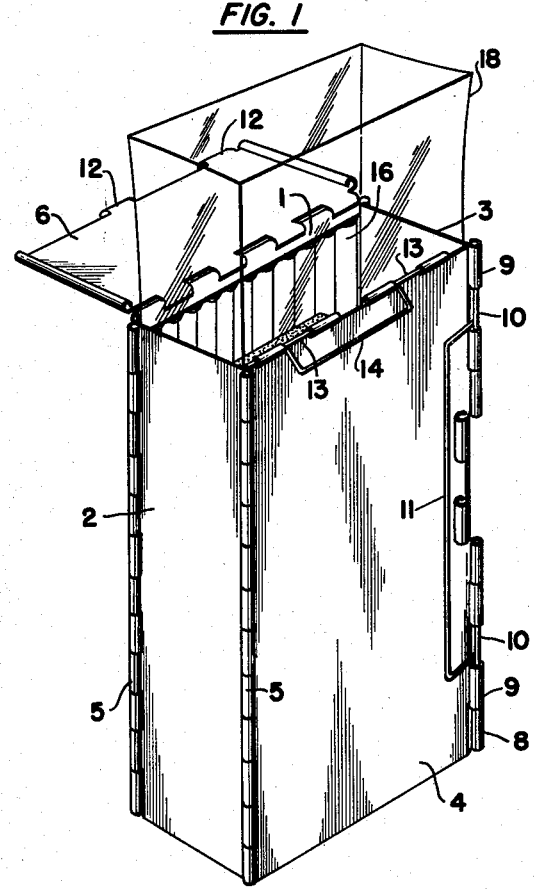
Figure 1 is a perspective view of a removable form with the bag inserted ready for packing.
Figure 3:
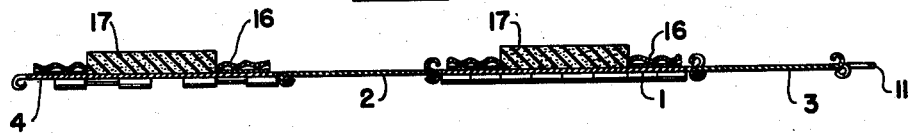
Figure 3 is a sectional view on line 3—3 of Figure 2.

According to the disclosure of the invention in Figures 1, 2 and 3 a collapsible and removable metal packing form is used having a back 1, sides 2 and 3 and front 4. These members are all attached together by permanent hinges 5. The back has a top 6 and a bottom 7 likewise permanently hinged thereto. The front 4 and side 3 have interlocking looped eyes 8 and 9 thereon which have passing therethrough a divided pintle 10, the two sections of the pintle being connected by rod 11. The top 6 and front 4 have similar eyes 12 connected together by pintle 13 on rod 14. The bottom 7 is hinged on back 1, and the other three sides of the bottom are held under curled edges 15 on the front and sides at the container. After folding the bottom in place, and closing the sides of the container, the eyes 8 and 9 are locked together by the pintle 10, and the top 6 may then be closed to form a completely tight form, which will withstand considerable pressure.

The front and back of the container preferably have glued thereto panels of corrugated board 16 containing only one face which is glued to the front and back of the metal container so that the flutes of the corrugated board form ridges extending vertically on the inside of the front and back of the metal container. These corrugated panels have their centers cut out and pieces of sponge rubber 17 are placed therein as quite clearly shown in Figure 3. When the transparent water tight bag 18 is placed on the opened out form, open as shown in Figure 2, and then the form is closed therearound, the bag and the container are ready to fill as shown in Figure 1. In filling the bag shown in Figure 1 the food product is brought up to the top of the metal container and the bag is then closed and sealed, the top 6 of the metal container is closed fast by means of the pintle 13 and the product is then ready for freezing. Because of the relative stiffness of the bag, in comparison to the fluid food, interstices or spaces are left between the flutes of the corrugated board, and between the edges of the sponge rubber 17 and the corrugated board, so that an adequate space is provided for the expansion of the food in its freezing. It is noted that neither the corrugation nor the rubber come quite to the edges of the metal container so that the food initially expands to the edges and makes a uniformly edged product. Should the expansion be greater than the interstices provided as above mentioned the sponge rubber will give somewhat and if necessary so would the corrugated board flutes. It is noted that both the corrugated board and the sponge rubber give a slower rate of heat conductivity in producing freezing than do the contacting metal panels and the edges of the panels which are also in contact with the food itself, through the bag, so that these edges and other unprotected panels freeze first and uniformly for each unit frozen in the metal container. After freezing the pintles in the edges of the container may be slid from place, the container opened, and the food taken out. It will be found to be frozen in the bag uniform with eight straight edges and it is adaptable to be packed in a storage container just as any other uniform member could be packed. Because of the transparency of the bag the food is readily apparent both to ascertain its variety as well as its quality.

Figure 4:
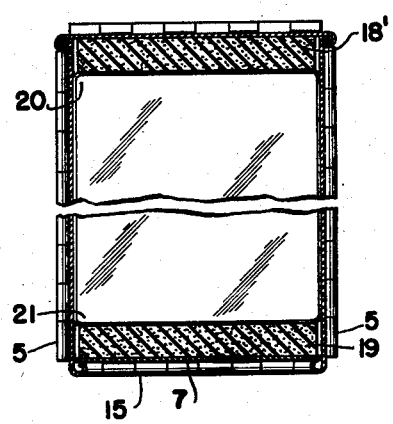
Figure 4 is a modification of a space providing mechanism in both ends of the container.

Other modifications of the space providing medium are shown. In Figure 4 sponge rubber sections 18' and 19 are shown at the top and bottom of the container which is broken away centrally, and this sponge rubber permits uniform freezing in the corners 20 and 21, and those opposite horizontally, as well as those at right angles thereto, and the compression of the sponge rubber allows for the required expansion of the food in freezing at both ends of the container. Because of the relative uniformity of the expansion of the sponge rubber, the product will expand uniformly, longitudinally and make straight edges around both the top and bottom, the sides allowing for the uniform fast conductivity of the heat from the food faster than that allowed at the ends of the sponge rubber.

Figure 5:
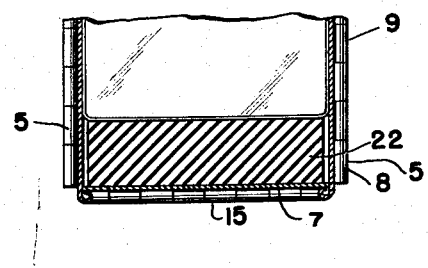
Figure 5 is another modification of a space providing medium at one end of the container.

In the modification shown in Figure 5 a single sponge rubber unit 22 of considerable thickness is provided at the bottom. It is preferable that this single unit of rubber be thicker than that provided when two are used as in the modification of Figure 4. Here again uniformity of the expansion of the food product is provided because of the uniform conductivity of the sides of the metal container and a right angled bottom is therefore provided for the frozen unit of food.

Figure 6:
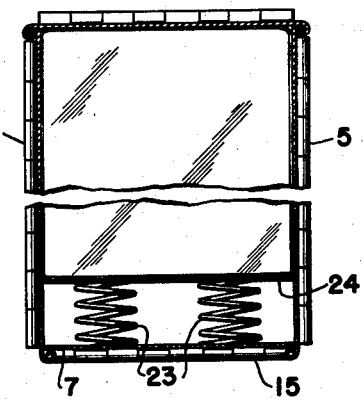
Figure 6 is another modification of a space providing medium at one end of the container.

Two springs 23—23 may likewise be provided at the bottom of the container as shown in Figure 6. These springs preferably bear against a plate 24 which supports the bottom of the bag.

In Figure 7 a modification is shown with corrugating panels 25 on the front and back and the edges of the metal container. These panels are like those shown at 16 in Figure 2, but without the centers cut out. The spaces or interstices 26 in the four panels of corrugated board 25 allow ample space for the uniform expansion of the food. In this modification it is again noted that the panels of corrugated board do not go quite to the edge of the metal container.

In the modification shown in Figure 8 on the back 1 an opening 27 has been cut, and a piece of material 28 preferably of less heat conductivity than the metal is placed therein overlapping at 29 with the sides of the opening on the back 1. This material is preferably of a resilient nature and its normal position is to be sprung in as shown dotted lines at 30 in Figure 9. With the expansion of the food product in freezing the piece of material 28 springs outwardly as shown in the solid lines of Figure 9. This springing allows the additional space required by the expansion of the food products upon freezing. Another possible means of providing expansible space is shown in the front 4 of this same view, Figure 8. In this view the panel of the front is struck inwardly as shown at 31 in Figure 10. This construction provides the edge 32 between the struck in member 31 and the plane of the front 4 so that as the bag is placed therein it does not quite go into the corners around the panel 31, until the expansion of the bag takes place because of the freezing of the food product. Either of these two forms shown in these Figures 8, 9 and 10 could be used in the same container or both could be used on a single container as illustrated.

Figure 11:
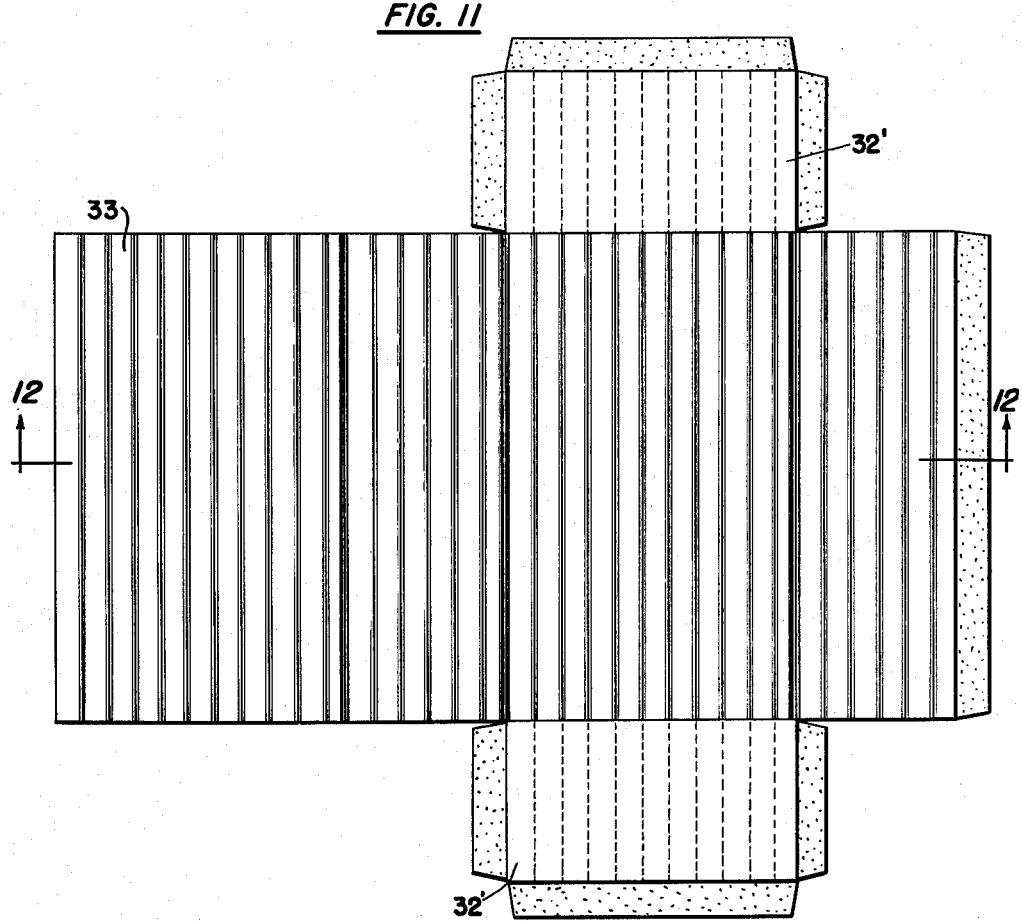
Figure 11 is a plan view of a destructible space providing packing medium.
Figure 12:
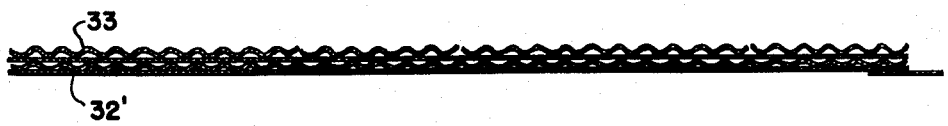
Figure 12 is a sectional view on line 12—12 of Figure 11.

A non-metallic form of container could likewise be used which however would not be transparent in the final appearance of the product even though it is intended that the product be placed in the transparent bag as heretofore described. This non-transparent carton shown in Figures 11 and 12 is preferably made of double faced fluted board 32' on all six sides but with the four horizontal sides, the front, back and two sides having additional panels of fluted board 33 glued thereto. The interstices between the flutes of these side and front and back panels 33 provide sufficient space for the expansion of the bag and food products during freezing.

Figure 16:
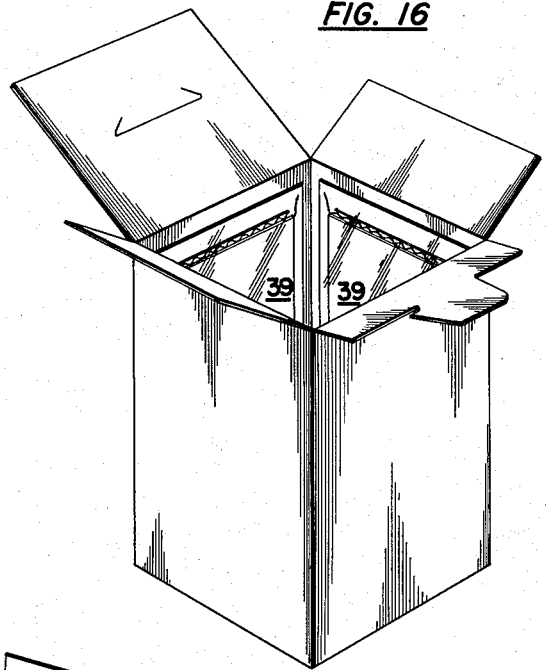
Figure 16 is a perspective view of a container for packing without the additional bag with space providing means on four internal sides.
Figure 13:
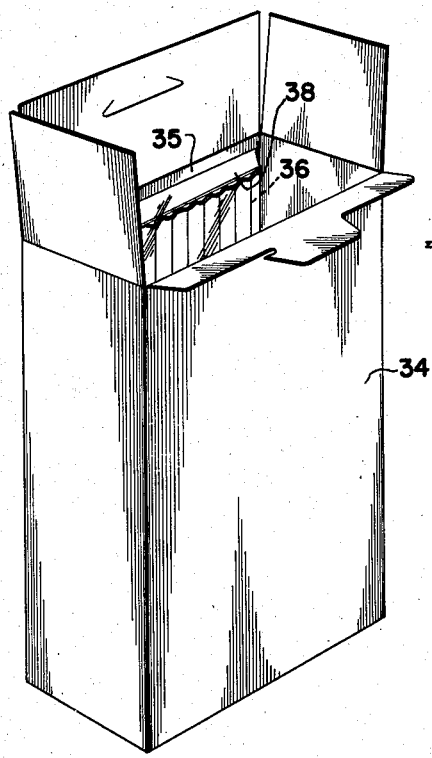
Figure 13 is a perspective view of a container providing space for expansion intended for use without the additional bag.
Figure 15:
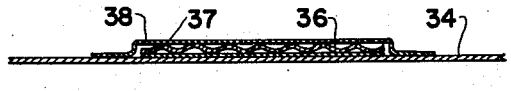
Figure 15 is a sectional view on line 15—15 of Figure 14.
Figure 18:
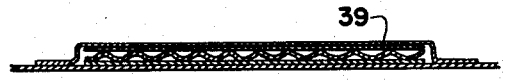
Figure 18 is a cross-sectional view on line 18—18 of Figure 17.
Figure 14:
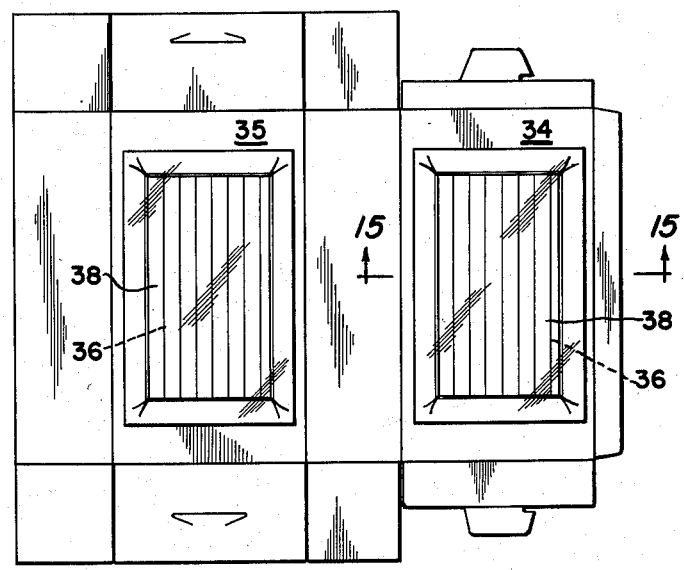
Figure 14 is a plan view of the container of Figure 13 before folding.
Figure 17:
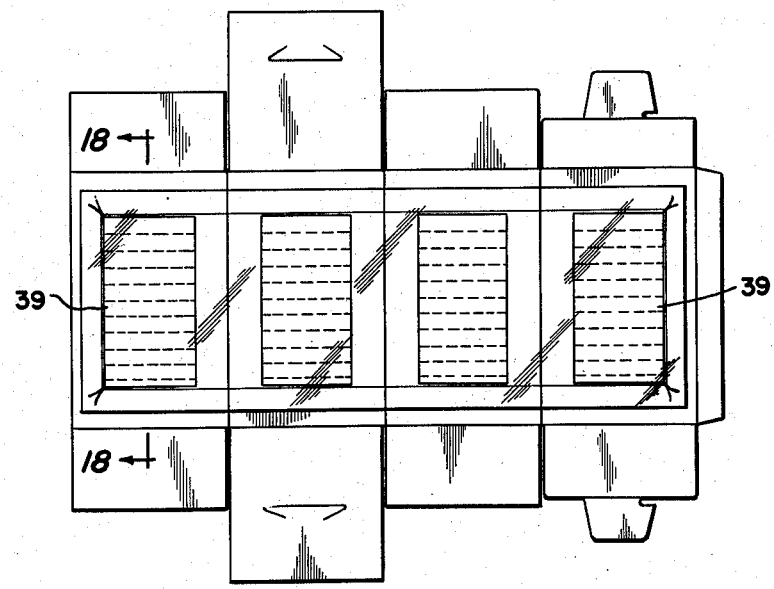
Figure 17 is a plan view of the container of Figure 16 before folding.

In all the forms above described it is preferred that the bag be used with the product. In the forms of the invention shown in Figures 13 to 18 inclusive products such as asparagus can be frozen without the use of the bag although in these forms a non-transparent carton is used. This carton is of the usual disposable paraffined construction on the inside and in the modification shown in Figures 13, 14 and 15 the front 34 and back 35 have a corrugated board section 36 glued thereto with upwardly projecting flutes as shown at 37. These fluted sections are covered with a piece of the polyethylene material 38, which sinks into the spaces between the flutes of the corrugated board, providing adequate room for the expansion of the food. In the modification shown in Figures 16 to 18 inclusive similarly covered panels 39 are placed on all four sides of the box. In this modification a double faced corrugated panel is used, so that the spaces for expansion are primarily at the edges of the panel, as was true of the modification of Figure 10. This box is relatively square and such multiplication of the panels is desired to give a greater edge expansion to the polyethylene cover.

It will be noted that the packer in all the packages described fills the package to the top. All guesswork is eliminated. In the forms providing the transparent bag the outer container or packing form is removed. In all cases the edges of the food are exposed to the heat conducting surface uniformly, the expanding medium, or mediums, providing interstices with the sides of the container are spaced from the edges in all modifications except those of Figure 4, 5 and 6 and in these modifications one edge of the food is immediately adjacent the heat conducting surface of the greatest conductivity. In all cases exactly uniform shaped lumps or units of food are provided with uniform edges, on all twelve edges of the rectangular forms illustrated and where the package is initially in the bag, these bags, after removing the packing form, are absolutely regular in configuration on the edges so as to permit accurate packing and a pleasing appearance in every case.

It will be apparent from the above description that the freezing has been controlled in definable limits. It is known in advance precisely the shape of product which will finally be obtained. It will be apparent that many other modifications of the particular packing material can be made within the spirit of the invention, without departing from that invention as defined in the following claims. It is also apparent that other liquids than food product liquids could be frozen in the apparatus of this invention.

What is claimed as new and is desired to be secured by Letters Patent is:

1. Reusable apparatus for the controlled freezing of food and liquid product units so that the units will stack together evenly, characterized by the units being frozen in solid uniform shapes with all bounding lines of successive units being the same as those of the first unit, comprising a tightly closed and readily openable form, adaptable for complete immersion within a freezing medium and having solid walls excluding the freezing medium from the form, the walls joining each other angularly and providing an inner uniform unit shaping space for the receipt of unfrozen material to all the inner edges of the form that shape the outer contour edges of the unfrozen material into a unit upon freezing to conduct heat therefrom uniformly, resilient and insulating means within the form to promote a slower rate of heat conductivity than that at the said unit shaping edges, said last named means including a member mounted on the inside of the form on one wall thereof in fixed relation thereto and said means being expansible for the expansion of the material upon freezing, the solid walls of the tightly closed form retarding the action of the freezing medium adjacent said member.

2. Reusable apparatus for the controlled freezing of food and liquid product units so that the units will stack together evenly, characterized by the units being frozen in solid uniform shapes with all bounding lines of successive units being the same as those of the first unit, comprising a tightly closed and readily openable form adaptable for complete immersion within a freezing medium and excluded the freezing medium from the form, the form having walls, two being rectangular and parallel, the walls joining each other angularly and providing an inner uniform unit shaping space for the receipt of bagged unfrozen material to all the inner edges of the form that shape the outer contour edges of the unfrozen material into a unit upon freezing, to conduct heat therefrom uniformly, means within the form mounted on one wall thereof in fixed relation thereto to provide a slower rate of heat conductivity than that at the said unit shaping edges, said last named means having elevations from adjacent portions of the form and providing interstices for the entrance of the bagged material thereinto upon its expansion upon freezing, the tightly closed form retarding the action of the freezing medium adjacent said last named means.

3. Reusable apparatus for the controlled freezing of food and liquid product units so that the units will stack together evenly, characterized by the units being frozen in solid uniform shapes with all bounding lines of successive units being the same as those of the first unit, comprising a tightly closed and readily openable form adaptable for complete immersion within a freezing medium and having solid walls for the receipt of bagged unfrozen material to all the inner edges of the form that shape the outer contour edges of the unfrozen material into a unit upon freezing to conduct heat therefrom uniformly, means within the form mounted in fixed relation thereto to provide a slower rate of heat conductivity than that at the said unit shaping edges, said last named means being elevated from the surface of adjacent portions of the form, providing interstices between the elevated means and form for the entrance of the bagged material thereinto upon its expansion upon freezing, the solid walls of the tightly closed form retarding the action of the freezing medium adjacent said last named means and excluding the freezing medium from the form.

4. Reusable apparatus for the controlled freezing of food and liquid product units so that the units will stack together evenly, characterized by the units being frozen in solid uniform shapes with all bounding lines of successive units being the same as those of the first unit, comprising a tightly closed and readily openable form adaptable for complete immersion within a freezing medium and having solid walls for the receipt of bagged unfrozen material to all the inner edges of the form that shape the outer contour edges of the unfrozen material into a unit upon freezing, to conduct heat therefrom uniformly, an insulating false side adjacent and parallel to one of said walls, and resilient means spacing said false side from its adjacent parallel wall, said false side providing a slower rate of heat conductivity than that of the other wall surfaces, and being expansible to allow the expansion of the material upon freezing, the solid walls of the tightly closed form retarding the action of the freezing medium adjacent said false side and excluding the freezing medium from the form.

5. Reusable apparatus for the controlled freezing of food and liquid product units so that the units will stack together evenly, characterized by the units being frozen in solid rectangular uniform shapes with all bounding lines of successive units being the same as those of the first unit, comprising a tightly closed and readily openable form adaptable for complete immersion within a freezing medium and having six solid rectangular walls, for the receipt of bagged unfrozen material to all the inner edges of the form, to conduct heat therefrom uniformly one wall of said form having an elevation thereon, laterally spaced from the edges thereof, and providing a space between the elevation and the laterally adjacent portion of the wall, into which the bagged material expands upon its expansion on freezing, the solid walls of the tightly closed form retarding the action of the freezing medium adjacent said elevation and excluding the freezing medium from the form.

6. Reusable apparatus for the controlled freezing of food and liquid product units so that the units will stack evenly, characterized by the units being frozen in solid rectangular uniform shapes with all bounding lines of successive units being the same as those of the first unit, comprising a tightly closed and readily openable form adaptable for complete immersion within a freezing medium and composed of six solid rectangular walls, for the receipt of unfrozen material to all the inner edges of the form, one wall of said form having a resilient insulating portion spaced from the edges of said wall, which is normally sprung inwardly, and is sprung outwardly by the expansion of the material upon freezing, the solid walls of the tightly closed form retarding the action of the freezing medium adjacent said resilient portion and excluding the freezing medium from the form.

LLOYD G. TAYLOR.

REFERENCES CITED

The following references are of record in the file of this patent:

UNITED STATES PATENTS

| Number | Name | Date |
|---|---|---|
| 1,394,545 | French | Oct. 25, 1921 |
| 2,109,102 | Cocks | Feb. 22, 1938 |
| 2,254,406 | Zarotschenseff | Sept. 2, 1941 |
| 2,260,450 | Guinane | Oct. 28, 1941 |